United States Patent
Jiao et al.

(10) Patent No.: US 8,981,265 B2
(45) Date of Patent: Mar. 17, 2015

(54) ELECTRIC CIRCUIT AND SENSOR FOR DETECTING ARCING AND A TRANSPARENCY HAVING THE CIRCUIT AND SENSOR

(75) Inventors: Yu Jiao, Blawnox, PA (US); Hars Gyorgy, Budapest (HU); Ali N. Rashid, Covington, KY (US); Joseph Medzius, Cranberry Township, PA (US)

(73) Assignee: PPG industries Ohio, Inc., Cleveland, OH (US)

( * ) Notice: Subject to any disclaimer, the term of this patent is extended or adjusted under 35 U.S.C. 154(b) by 750 days.

(21) Appl. No.: 13/247,131

(22) Filed: Sep. 28, 2011

(65) Prior Publication Data

US 2013/0075531 A1 Mar. 28, 2013

(51) Int. Cl.
*H05B 1/02* (2006.01)
*B64C 1/14* (2006.01)
*H05B 3/86* (2006.01)

(52) U.S. Cl.
CPC ............ *B64C 1/1476* (2013.01); *H05B 1/0236* (2013.01); *H05B 3/86* (2013.01); *H05B 2203/016* (2013.01); *H05B 2203/035* (2013.01)
USPC ........... 219/507; 219/508; 219/541; 219/522; 219/497; 244/134 D; 244/129.3

(58) Field of Classification Search
CPC ............... H05B 3/86; H05B 2203/016; H05B 2203/025; H05B 1/02; B64D 15/12
USPC ................. 219/203, 497, 508, 522, 541, 547; 244/129.3, 134 D
See application file for complete search history.

(56) References Cited

U.S. PATENT DOCUMENTS

| | | | |
|---|---|---|---|
| 3,762,902 A | 10/1973 | Wagner et al. |
| 4,078,107 A | 3/1978 | Bitterice et al. |
| 4,610,771 A | 9/1986 | Gillery |
| 4,623,389 A | 11/1986 | Donley et al. |
| 4,806,220 A | 2/1989 | Finley |
| 4,829,163 A | 5/1989 | Rausch et al. |

(Continued)

FOREIGN PATENT DOCUMENTS

| | | |
|---|---|---|
| EP | 0 349 916 A1 | 1/1990 |
| EP | 0 367 210 A2 | 5/1990 |

(Continued)

OTHER PUBLICATIONS

International Search Report, PCT/US2012/054182, dated Dec. 19, 2012.

*Primary Examiner* — Mark Paschall
(74) *Attorney, Agent, or Firm* — Andrew C. Siminerio

(57) ABSTRACT

An electrical system responsive to overheating and/or electric arcing of an electrically conductive member, e.g. a heating member of an aircraft windshield, includes a first switch in a first current path, and a second switch in a second current path. The first current path is from an electrical power supply through the first switch, through an arc sensor to the heating member to the power supply. The second current path is from a temperature sensor monitoring the temperature of the heating member through the second switch to a temperature controller. When the temperature of the heating member is at or above a predetermined value, the temperature controller causes the first switch to open. When there is arcing, the second switch is moved to the open position. The temperature controller senses that the second switch is open and causes the first switch to open.

16 Claims, 6 Drawing Sheets

(56) References Cited

U.S. PATENT DOCUMENTS

| | | | |
|---|---|---|---|
| 4,894,513 A | 1/1990 | Koontz | |
| 4,902,875 A | 2/1990 | Koontz | |
| 4,939,348 A * | 7/1990 | Criss | 219/547 |
| 4,994,650 A | 2/1991 | Koontz | |
| 5,675,944 A | 10/1997 | Kerr et al. | |
| 5,821,001 A | 10/1998 | Arbab et al. | |
| 6,204,480 B1 * | 3/2001 | Woodard et al. | 219/203 |
| 6,326,598 B1 | 12/2001 | Carvalho et al. | |
| 6,522,509 B1 | 2/2003 | Engel et al. | |
| 6,522,529 B1 | 2/2003 | Huilgol et al. | |
| 6,608,445 B2 | 8/2003 | Melvin et al. | |
| 6,625,550 B1 | 9/2003 | Scott et al. | |
| 6,731,482 B2 | 5/2004 | Juncu | |
| 6,782,329 B2 | 8/2004 | Scott | |
| 6,794,882 B2 * | 9/2004 | Jessup | 324/522 |
| 6,882,158 B2 | 4/2005 | Blades | |
| 6,927,579 B2 | 8/2005 | Blades | |
| 7,023,196 B2 | 4/2006 | Khan et al. | |
| 7,038,897 B2 | 5/2006 | Csanky et al. | |
| 7,177,125 B2 | 2/2007 | Lazarovich et al. | |
| 7,215,519 B2 | 5/2007 | Blumenauer et al. | |
| 7,219,023 B2 | 5/2007 | Banke et al. | |
| 7,253,640 B2 | 8/2007 | Engel et al. | |
| 7,282,921 B2 | 10/2007 | Sela et al. | |
| 7,391,218 B2 | 6/2008 | Kojori et al. | |
| 7,436,641 B2 | 10/2008 | Holley | |
| 7,570,146 B2 | 8/2009 | Mills et al. | |
| 7,570,470 B2 | 8/2009 | Holley | |
| 7,633,727 B2 | 12/2009 | Zhou et al. | |
| 7,646,572 B2 | 1/2010 | Mills et al. | |
| 7,672,099 B2 | 3/2010 | Bax et al. | |
| 7,688,558 B2 | 3/2010 | Bax et al. | |
| 7,764,473 B2 | 7/2010 | Shaak et al. | |
| 7,868,621 B2 | 1/2011 | Liu et al. | |
| 7,952,842 B2 | 5/2011 | Engel | |
| 7,952,843 B2 | 5/2011 | Potter | |
| 8,004,283 B2 | 8/2011 | Mills et al. | |
| 8,004,418 B2 | 8/2011 | Hetzmannseder et al. | |
| 8,008,585 B2 | 8/2011 | Mills et al. | |
| 8,461,495 B2 * | 6/2013 | Gerhardinger | 219/543 |
| 2002/0089799 A1 | 7/2002 | Juncu | |
| 2002/0097056 A1 | 7/2002 | Blades | |
| 2002/0105764 A1 | 8/2002 | Bax | |
| 2003/0201780 A1 | 10/2003 | Blades | |
| 2004/0145840 A1 | 7/2004 | Langford et al. | |
| 2004/0156154 A1 | 8/2004 | Lazarovich et al. | |
| 2005/0083617 A1 | 4/2005 | Blumenauer et al. | |
| 2007/0002422 A1 | 1/2007 | O'Shaughnessy | |
| 2007/0138010 A1 | 6/2007 | Ajayan | |
| 2009/0310324 A1 | 12/2009 | Mills et al. | |
| 2010/0039741 A1 | 2/2010 | Booth et al. | |
| 2010/0163675 A1 * | 7/2010 | Rashid et al. | 244/129.3 |
| 2010/0168935 A1 | 7/2010 | Rashid et al. | |
| 2010/0259859 A1 | 10/2010 | Prabhu et al. | |
| 2010/0298393 A1 | 11/2010 | Vanderklish et al. | |
| 2010/0301976 A1 | 12/2010 | Mills et al. | |
| 2011/0141644 A1 | 6/2011 | Hastings et al. | |
| 2011/0273183 A1 | 11/2011 | Shea | |

FOREIGN PATENT DOCUMENTS

| | | |
|---|---|---|
| EP | 1174497 B1 | 1/2002 |
| EP | 1174974 A3 | 1/2002 |
| EP | 1174974 B1 | 1/2002 |
| EP | 1364437 A0 | 8/2002 |
| EP | 1279965 B1 | 1/2003 |
| EP | 1285282 B1 | 2/2003 |
| EP | 1595152 B1 | 11/2005 |
| EP | 1649474 B1 | 4/2006 |
| EP | 1667303 A3 | 6/2006 |
| EP | 1983630 A3 | 10/2008 |
| EP | 2342573 A0 | 3/2010 |
| EP | 2179432 B1 | 4/2010 |
| WO | 200201691 A1 | 1/2002 |
| WO | 2002061905 A2 | 8/2002 |
| WO | 2002061905 A3 | 8/2002 |
| WO | 2005060062 A2 | 6/2005 |
| WO | 2009088500 A1 | 7/2009 |
| WO | 2010032040 A2 | 3/2010 |
| WO | 2010051221 A1 | 5/2010 |
| WO | 2011069801 A1 | 6/2011 |

* cited by examiner

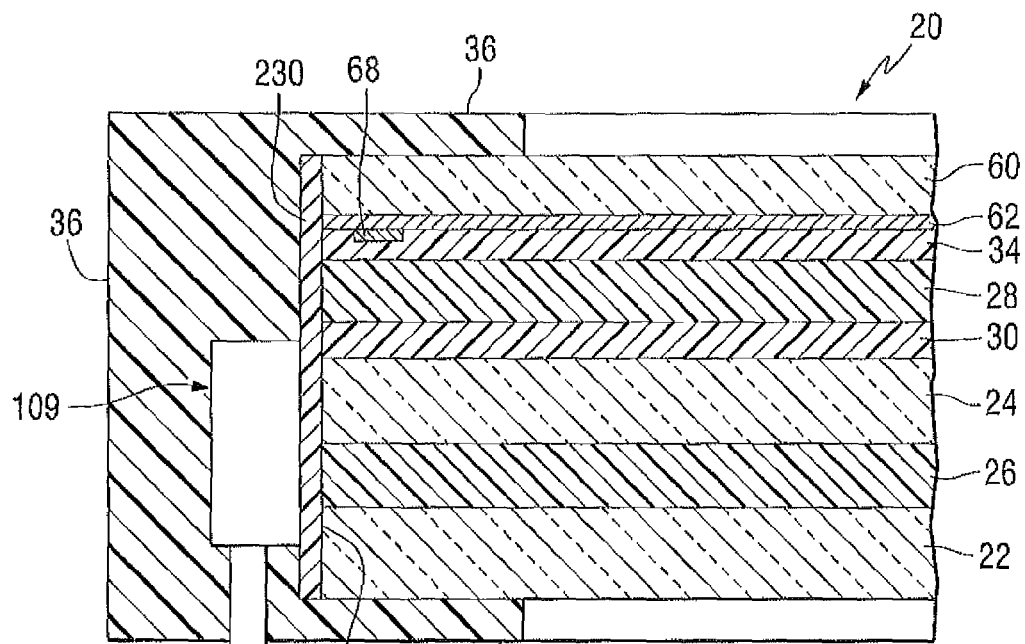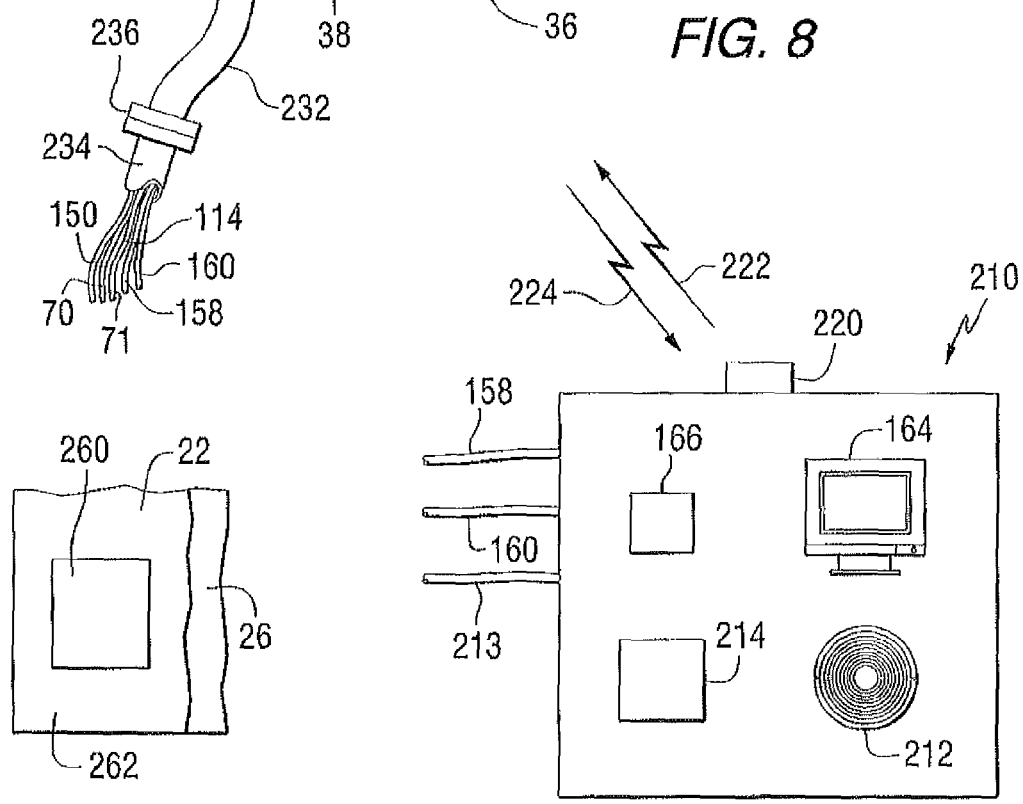

ELECTRIC CIRCUIT AND SENSOR FOR DETECTING ARCING AND A TRANSPARENCY HAVING THE CIRCUIT AND SENSOR

CROSS-REFERENCE TO RELATED APPLICATIONS

The subject matter of this application is related to the subject matter of U.S. patent application Ser. No. 12/345,932 filed on Dec. 30, 2008 in the names of Ali N. Rashid, Monroe A. Stone and James R. Priddy, Jr. titled "A METHOD OF AND SYSTEM FOR MAINTAINING OPERATING PERFORMANCE OF A TRANSPARENCY, and U.S. patent application Ser. No. 12/345,952 filed on Dec. 30, 2008 in the names of Ali Rashid, Monroe A. Stone and James Priddy and titled TRANSPARENCY HAVING SENSORS. U.S. patent application Ser. Nos. 12/345,932 and 12/345,952 in their entirety are hereby incorporated herein by reference.

BACKGROUND OF THE INVENTION

1. Field of the Invention

This invention relates to an electric circuit and sensor for detecting arcing and a transparency having the sensor, and more particularly, to an electric circuit and sensor for detecting arcing of an electrical heating system of an aircraft transparency, e.g. a laminated aircraft windshield and to a laminated aircraft windshield having portions of the electric circuit and sensor.

2. Discussion of the Available Technology

Aircraft or aerospace windows, e.g. aircraft windshields include a laminate of plastic layers or sheets, glass layers or sheets and combinations thereof. The layers of an inner segment of the windshield face the interior of the aircraft and provide structural stability to the windshield. The layers of an outer segment of the windshield face the exterior of the aircraft. The outer segment of the windshield, which can also provide structural stability, is usually provided with accessories for visual acuity. For example and not limiting to the discussion, the outer segment of the windshield can include an electrical conductive coating, or a plurality of electrical conductive wires, between and connected to a pair of spaced bus bars to heat the outer surface of the windshield to prevent the formation of fog, snow and ice, and/or to remove fog, snow and ice from, the surface of the windshield facing the exterior of the aircraft, also referred to as the outer surface of the windshield.

As is appreciated by those skilled in the art, as the service or operating time of the aircraft windshield increases, the operating efficiency of the windshield decreases until such time that the accessories of the windshield become non-functional, and the windshield needs to be replaced or repaired. More particularly and not limiting to the discussion, the peripheral edge of the windshield has an outboard moisture seal that is a barrier to prevent moisture from entering between the plastic and glass layers or sheets of the windshield. When the seal fails, e.g. cracks and/or the layers debond due to erosion caused by wind and rain; moisture enters between the layers of the windshield. While the cracking or de-bonding of the seal is not a structural issue, when moisture moves between the layers of the windshield, the windshield can de-laminate, and the conductive coating or wires, whichever is present, can be damaged and fail, thereby reducing the service life of the windshield. More particularly, when delamination of the windshield occurs, increased amounts of moisture move between the layers of the windshield accelerating the degradation of the windshield, e.g. causing arcing, damage and/or failure of the bus bars and the electrical conductive coating or wires thereby reducing or eliminating the defrosting capabilities of the windshield.

At the present time sensors for detecting arcing are available, e.g. disclosed in the above-mentioned U.S. patent application Ser. Nos. 12/345,932 and 12/345,952. Although the presently available sensors for detecting arcing are acceptable, they have limitations. For example, but not limiting to the discussion, the presently available sensors for detecting arcing of an electrical conductive coating between two bus bars measures the current at a first bus bar and the current at a predetermined position on the conductive coating or at the second bus bar. When the difference between the two measurements exceeds a predetermined current difference, a signal is forwarded to a control system to discontinue the current input to the bus bars. This type of sensor does not take into account that the current to the bus bars includes electric noise and interference that results from the airplane generator providing electrical power to the aircraft transparency, the lights, the air conditioner and other electrical equipment of the aircraft. As a result, the readings are not an accurate representation of current variations caused by arcing.

Based on the preceding discussion, it can be appreciated by those skilled in the art that it would be advantageous to provide an electric circuit and sensor for detecting arcing, and a transparency having components of the circuit and sensor, that eliminates the limitations of the presently available electric circuits and sensors for detecting arcing.

SUMMARY OF THE INVENTION

This invention relates to an electrical system responsive to overheating and/or electric arcing of an electrically conductive member. The system including, among other things, a temperature sensor for sensing the temperature of the electrically conductive member; a first switch to be electrically connected to a power source; an arc sensor for monitoring voltage of the electrically conductive member, the arc sensor electrically connected to the first switch, wherein the first switch in a closed position provides a continuous electrical path through the first switch to the arc sensor, and the first switch in the open position prevents current from moving through the first switch; a temperature controller acting on the first switch to selectively open the first switch; a second switch electrically connecting the temperature sensor to the temperature controller, wherein the first switch in a closed position electrically interconnects the temperature sensor and the temperature controller, and in an open position disconnects the first switch and the temperature sensor; a filter and modifying system connected to the arc sensor and acting on the second switch, wherein with the first switch and the second switch in the closed position a first electric path is provided through the first switch to the electrically conductive member and a second electrically conductive path is provided from the temperature sensor, through the second switch, to the temperature controller, wherein the temperature controller opens the first switch when the temperature controller receives a predetermined signal from the temperature sensor, and wherein the filter and modifying system opens the second switch when a signal from the arc sensor indicates a predetermined level of arcing, and the temperature controller responsive to the opening of the second switch opens the first switch, if the first switch is closed.

Further, this invention relates to an aircraft including, among other things, a windshield, including, among other things, a heatable member for removing snow, fog or ice from an outer surface of the windshield, the heatable member comprising a pair of spaced bus bars and an electrically conductive member between and in electrical contact with the spaced bus bars, and an electrical system to monitor and/or control performance of the heatable member. The electrical system including, among other things, a temperature sensor for sensing the temperature of the electrically conductive member; a first switch to be electrically connected to a power source of the aircraft; an arc sensor for monitoring voltage of the electrically conductive member, the arc sensor electrically connected to the first switch, wherein the first switch in a closed position provides a continuous electrical path from the power source of the aircraft through the first switch to the arc sensor and from the arc sensor to a first one of the pair of spaced bus bars of the heatable member, and the second one of the spaced bus bars of the heatable member connected to the power source, and the first switch in the open position prevents current from moving from the power source to the first bus bar; a temperature controller acting on the first switch to selectively open the first switch; a second switch electrically connecting the temperature sensor to the temperature controller, wherein the first switch in a closed position electrically interconnects the temperature sensor and the temperature controller, and in an open position disconnects the first switch and the temperature sensor; a filter and modifying system connected to the arc sensor and acting on the second switch, wherein with the first switch and the second switch in the closed position a first electric path is provided from the power supply through the first switch, through the heatable member to the power source, and a second electrically conductive path is provided from the temperature sensor, through the second switch, to the temperature controller, wherein the temperature controller opens the first switch when the temperature controller receives a predetermined signal from the temperature sensor, and wherein the filter and modifying system opens the second switch when a signal from the arc sensor indicates a predetermined level of arcing, and the temperature controller responsive to the opening of the second switch opens the first switch, if the first switch is closed.

Still further, this invention relates to a method of controlling electrical input to a heatable member of an aircraft transparency to eliminate overheating and/or arcing, wherein the heatable member comprises an electrically conductive member to heat outer surface of the transparency. The method includes, among other things forwarding a signal representing a temperature of the electrically conductive member through a first switch, through a temperature controller to a second switch, wherein when the temperature controller indicates a temperature equal to or above a predetermined value, the temperature controller acts to open the second switch; monitoring current/voltage from a power source to the electrically conductive member as the current/voltage flows from the power source through the second switch to the electrically conductive member, wherein the monitoring is at a position between the second switch and the electrically conductive member and provides monitoring information, and acting on the monitoring information to open the first switch when the monitoring information has predetermined selected information, wherein opening the first switch opens the second switch.

BRIEF DESCRIPTION OF THE DRAWING

FIG. 7 is an elevated front view of a cabinet housing a health monitoring system for the aircraft, the health monitoring system incorporating features of the invention to detect arcing of the heatable member of the type shown in FIG. 4.

FIG. 8 is a partial cross sectional view of an aircraft transparency of the type shown in FIG. 3 having selected components of the electric circuit and sensor of the arc detector of the invention mounted on the transparency in accordance with the teachings of the invention.

FIG. 9 is a fragmented elevated plan view of another non-limiting embodiment of the invention for mounted selected components of the electric circuit and sensor of the arc detector of the invention on an aircraft window of the type shown in FIG. 3.

DETAILED DESCRIPTION OF THE INVENTION

Figure 1:
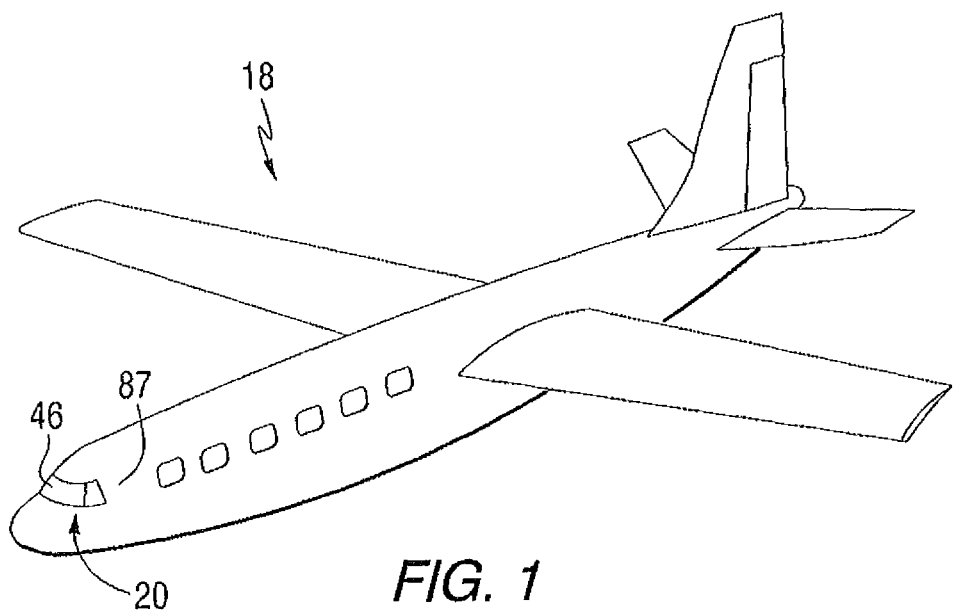
FIG. 1 is an isometric view of an aircraft having non-limiting embodiments of the invention.

As used herein, spatial or directional terms such as "inner", "outer", "left", "right", "up", "down", "horizontal", "vertical", and the like, relate to the invention as it is shown in the drawing on the figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the property desired and/or sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all sub-ranges subsumed therein. For example, a stated range of "1 to 10" should be considered to include any and all subranges between and inclusive of the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Also, as used herein, the term "positioned over" or "mounted over" means positioned on or mounted over but not necessarily in surface contact with. For example, one article or component of an article "mounted over" or positioned over" another article or component of an article does not preclude the presence of materials between the articles, or between components of the article, respectively.

Before discussing several non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise, in the following discussion like numbers refer to like elements.

Non-limiting embodiments of the invention will be directed to aircraft laminated transparencies, and in particular, to an aircraft windshield. The invention, however, is not limited to any particular type of aircraft and aircraft transparency, and the invention can be practiced on any type of aircraft and aircraft transparency, e.g. but not limited to windows of the type having a medium responsive to electric stimuli to increase or decrease visible transmission, e.g. but not limited to the type of window disclosed in U.S. Published Patent Application 2007/0002422A1, and on aircraft windows of the type having an insulated air space between a pair of laminated sheets. The entire disclosures of the publications identified in this paragraph are hereby incorporated by reference.

Further, the invention can be practiced on commercial and residential windows, e.g. but not limited to the type disclosed in U.S. Pat. No. 5,675,944, which patent in its entirety is hereby incorporated by reference; a window for any type of land vehicle; an aircraft canopy, cabin window and windshield for any type of air and space vehicle, a window for any above or below water vessel, and a window for a viewing side or door for any type of containers, for example but not limited to a refrigerator, cabinet and/or oven door. Still further, the invention is not limited to the material of the layers or sheets of the aircraft window, and the layers or sheets can be made of, but not limited to, cured and uncured plastic sheets; annealed, heat strengthened, and heat and chemically strengthened, clear, colored, coated and uncoated glass sheets. Still further the invention can be practiced on windows having opaque sheets, e.g. but not limited to wood and metal sheets, and glass sheets having an opaque coating, and combinations thereof.

Figure 2:
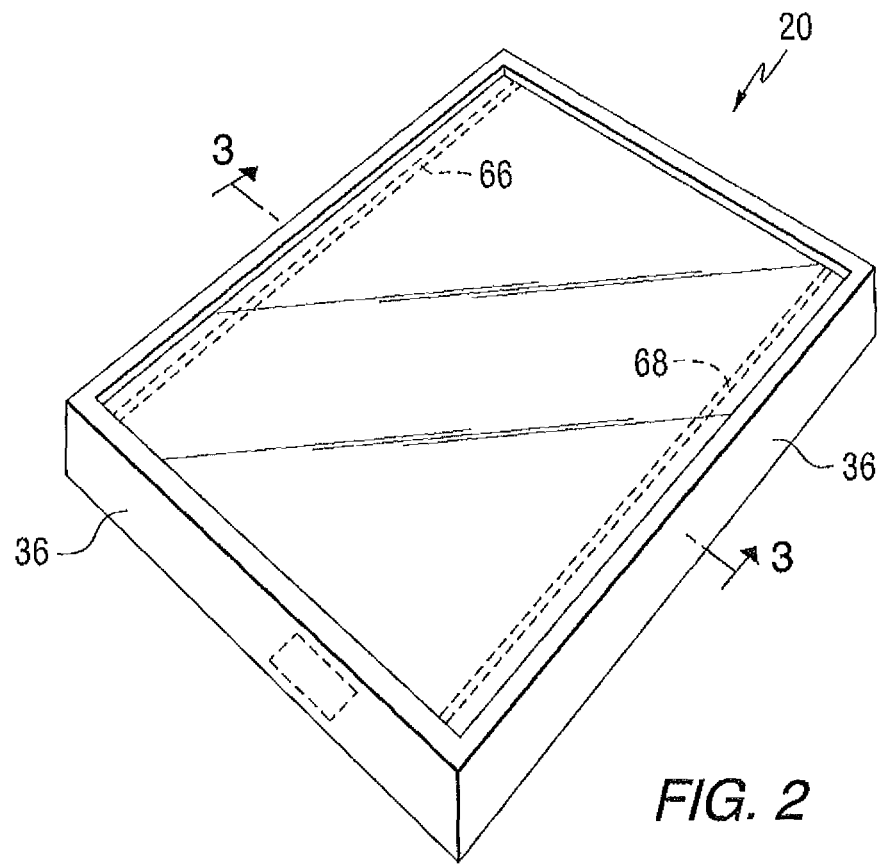
FIG. 2 is an isometric view of an aircraft transparency incorporating features of the invention.

Shown in FIG. 1 is an aircraft 18 having a non-limiting embodiment of an aircraft windshield 20 (FIGS. 2-4), and arc sensor and monitor (see FIGS. 5-9) of the invention. The windshield 20 (FIG. 3) includes a first transparent sheet 22 secured to a second transparent sheet 24 by a first vinyl-interlayer 26; the second sheet 24 secured to a second vinyl-interlayer 28 by a first urethane interlayer 30, and the second vinyl-interlayer 28 secured to a heatable member 32 by a second urethane interlayer 34. An edge member or moisture barrier 36 of the type used in the art, e.g. but not limited to a silicone rubber or other flexible durable moisture resistant material is secured to (1) peripheral edge 38 of the windshield 20, i.e. the peripheral edge 38 of the first and second sheets 22, 24; of the first and second vinyl-interlayers 26, 28, and the first and second urethane interlayers 30, 34 and of the heatable member 32; (2) margins or marginal edges 40 of outer surface 42 of the windshield 20, i.e. the margins 40 of the outer surface 42 of the first glass sheet 22 of the windshield 20, and (3) margins or marginal edges 44 of outer surface 46 of the windshield 20, i.e. margins of the outer surface 46 of the heatable member 32.

As is appreciated by those skilled in the art and not limiting to the invention, the first and second glass sheets 22, 24; the first and second vinyl-interlayers 26, 28 and the first urethane interlayer 30 form the structural part, or inner segment, of the windshield 20, and the outer surface 42 of the glass sheet 22 of the windshield 20 faces the interior of the aircraft 18 (hereinafter the outer surface 42 of the glass sheet 22 is also referred to as the inner surface 42 of the windshield 20), and the second urethane layer 34 and the heatable member 32 form the non-structural part, or outer segment, of the windshield 20, and the surface 46 of the heatable member 32 of the windshield 20 faces the exterior of the aircraft 16. The heatable member 32 provides heat to prevent fog from forming on, to remove fog from, to prevent snow and ice from forming on, and/or to melt snow and ice on, the outer surface 46 of the heatable member 32 of the windshield 20 (hereinafter the outer surface 46 of the heatable member 32 is also referred to as the outer surface 46 of the windshield 20) in a manner discussed below.

As can be appreciated, the invention is not limited to the construction of the windshield 20 and any construction of aircraft transparencies, e.g. aircraft windshields used in the art can be used in the practice of the invention. For example and not limiting to the invention, the windshield 20 can include a construction wherein the vinyl interlayer 28 and the urethane interlayer 30 are omitted, and/or the sheets 22 and 24 are glass or plastic sheets. Generally the sheets 22 and 24 of the windshield 20 are clear chemically strengthened glass sheets; however, the invention is not limited thereto, and the glass sheets 22 and 24 can be heat strengthened or heat tempered glass sheets. Further as is appreciated by those skilled in the art, the invention is not limited to the number of glass sheets, vinyl interlayers or urethane interlayers that make up the windshield 20, and the windshield 20 can have any number of sheets and/or interlayers.

Figure 4:
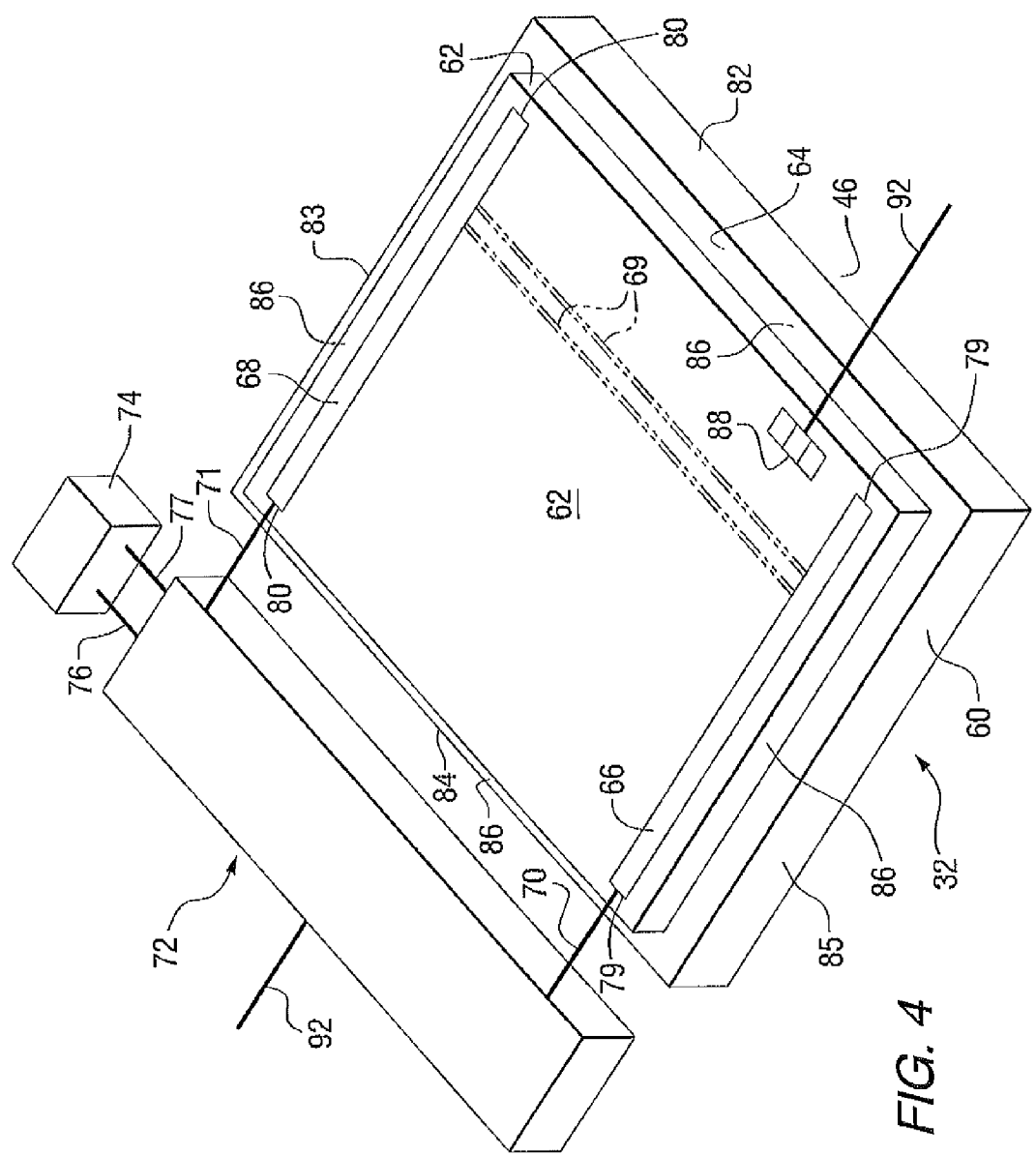
FIG. 4 is an isometric view of a heatable member of an aircraft transparency having a block diagram to indicate features of the invention to detect arcing of the heatable member.

The invention is not limited to the design and/or construction of the heatable member 32, and any electrical conductive heatable member used in the art to heat a surface of a sheet to prevent the formation of fog, snow and/or ice on, to melt snow and ice on, and/or to remove fog, snow and ice from, the outer surface of a windshield can be used in the practice of the invention. With reference to FIG. 4, in one non-limiting embodiment of the invention, the heatable member 32 includes the glass sheet 60 having a conductive coating 62 applied to surface 64 of the glass sheet 60, and a pair of spaced bus bars 66, 68 in electrical contact with the conductive coating 62. The invention is not limited to the composition of the conductive coating 62, and any of the electrical conductive coatings known in the art can be used in the practice of the invention. For example and not limiting to the invention, the conductive coating 62 can be made from any suitable electrical conductive material. Non-limiting embodiments of conductive coatings that can be used in the practice of the invention include, but are not limited to, a pyrolytic deposited fluorine doped tin oxide film of the type sold by PPG Industries, Inc. under the trademark NESA®; a magnetron sputter deposited tin doped indium oxide film of the type sold by PPG Industries, Inc under the trademark NESATRON®; a coating made up of one or more magnetron sputter deposited films, the films including, but not limited to a metal film, e.g. silver between metal oxide films, e.g. zinc oxide and/or zinc stannate, each of which can be applied sequentially by magnetron sputtering, e.g. as disclosed in, but not limited to, U.S. Pat. Nos. 4,610,771; 4,806,220 and 5,821,001. The disclosures of U.S. Pat. Nos. 4,610,771; 4,806,220 and 5,821,001 in their entirety are hereby incorporated by reference.

As can be appreciated, the invention is not limited to the use of an electrical conductive coating to heat the glass sheet 60, and the invention contemplates the use of any type of member that can be electrically heated, e.g. but not limited to electrical conducting wires. The wires, e.g. wires 69 shown in phantom in FIGS. 3 and 4 can be embedded in a sheet of a plastic interlayer, e.g. but not limited to the interlayer 34 between the bus bars 66 and 68, and electrically connected to the bus bars 66 and 68. Such a heating arrangement is known in the art under the PPG Industries Ohio Inc. trademark AIRCON® and is disclosed in U.S. Pat. No. 4,078,107, which patent in its entirety is incorporated herein by reference.

The invention is not limited to the design and/or construction of the bus bars 66 and 68, and any of the types of bus bars used in the art can be used in the practice of the invention. Examples of bus bars that can be used in the practice of the invention, include, but are not limited to, the types disclosed in U.S. Pat. Nos. 3,762,902; 4,623,389; 4,894,513; 4,994,650, and 4,902875, which patents in their entirety are hereby incorporated by reference.

With continued reference to FIG. 4, in one non-limiting embodiment of the invention, each of the bus bars 66 and 68 are connected by a wire 70 and 71, respectively, to an intelligent electrical power controller and monitoring system 72 of the invention (discussed in more detail below), and the controller and monitoring system 72 is connected to aircraft electrical power supply 74 by wires or electric cables 76 and 77. Although not limiting to the invention, ends 79 of the bus bar 66, and ends 80 of the bus bar 68 are spaced from adjacent sides 82-85 of the glass sheet 60, and sides 86 of the coating 62 are spaced from the sides 82-85 of the glass sheet 60, to prevent arcing of the bus bars 66 and 68, and the coating 62 with metal body cover 87 of the aircraft 18 (see FIG. 1).

A temperature sensor 88 is mounted on the conductive coating 62 to sense the temperature of the conductive coating 62 of the heatable member 32, and is connected to the intelligent electrical power controller and monitoring system 72 by a wire or electric cable 92 in a manner discussed below. The invention is not limited to the temperature sensor 88, and any of the types used in the art can be used in the practice of the invention. Further, the invention is not limited to the number of temperature sensors 88 mounted on the coating 62, and any number, e.g. one, two or three can be mounted on the coating 62 to sense the temperature of different areas of the coating 62. In one non-limiting embodiment of the invention, the temperature sensor was a thermocouple, and three thermocouples were mounted on the coating 62.

Figure 5:
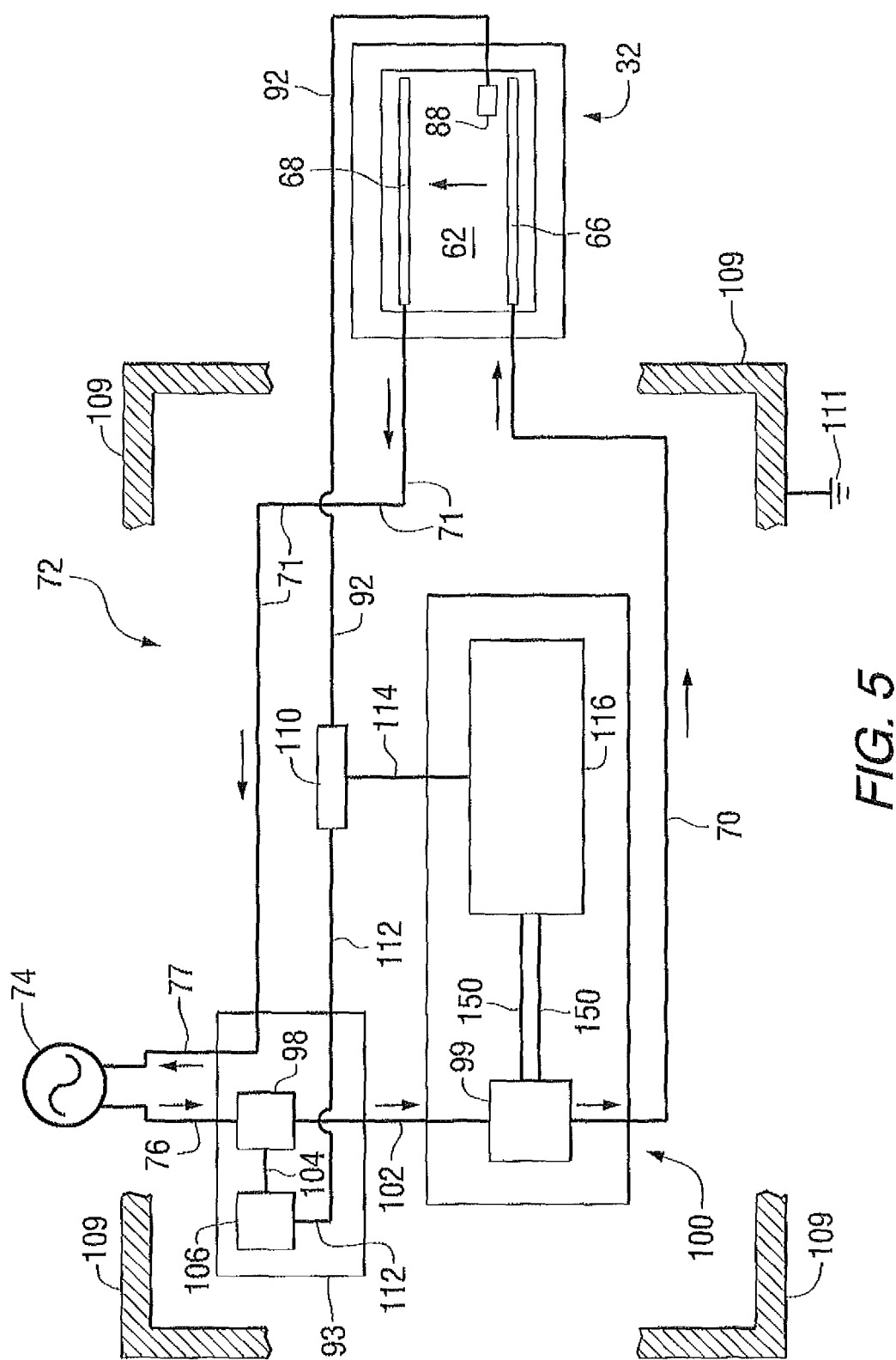
FIG. 5 is a block diagram of a non-limiting embodiment of an intelligent electrical power controller and monitoring system of the invention connecting an electrical power supply of the aircraft to the heatable member of the type shown in FIG. 4.

With reference to FIG. 5, in one non-limiting embodiment of the invention, the aircraft power supply 74 supplies alternating electric current along the wires 76 and 77 to a window heat controller 93 of the intelligent electrical power controller and monitoring system 72. As is appreciated by those skilled in the art, the invention is not limited to the power supply 74 and the power supply 74 can be an alternating current supply as shown in FIG. 5 or a direct current supply as is known in the art. The wire 76 is connected to one pole of a switch 98 of the window heat controller 93, and the other pole of the switch 98 is connected to an arc sensor 99 of an arc monitoring and detecting system 100 of the invention by a wire or electric cable 102. The switch 98 is usually in the closed position and is moved from the closed position to the open position and vise versa by signals forwarded along wire or electric cable 104 from a control logic for a heat controller 106 of the window heat control 93. The arc sensor 99 is connected to the bus bar 66 of the heatable member 32 by the wire 70. The bus bar 68 of the heatable member 32 is connected to the power supply 74 by the wire 71.

In one non-limiting embodiment of the invention, components of the intelligent electrical power controller and monitoring system 72 are mounted in a Faraday box 109, and the Faraday box 109 connected to ground, e.g. the body 81 of the aircraft 18 (see FIG. 1) by the wire or cable 111 (see FIG. 5) to block out external static electric fields.

With continued reference to FIG. 5, the temperature sensor 88 is connected to one pole of an electronic switch 110 by the wire 92, and a second pole of the switch 110 is connected by wire 112 to the control logic 106 of the window heat controller 93. The switch 110 is usually in the closed position and is moved from the closed position to the open position and from the open position to the closed position by signals forwarded to the switch 110 along wire or electric cable 114 from a signal filtering and modifying system 116 of the arc monitoring and detecting system 100.

The arc monitoring and detecting system 100 of the invention provides for electrically disconnecting the heating member 32 and the power supply 74 from one another when any of the following conditions are detected; (a) the temperature of the heatable member 32 is greater than a predetermined temperature, (b) major arcing, and (c) there is a series of microarcing greater than an allocated predetermined number in a given time period.

Consider now Condition (a) the temperature of the heatable member 32 is greater than a predetermined temperature. With reference to FIG. 5, the switch 98 of the window controller 93 and the switch 110 are each in the closed position to heat the heatable member 32 to remove fog, snow and/or ice snow from the outer surface 46 of the windshield 20 (see FIG. 3). The temperature of the heatable member 32 is sensed by the temperature sensor 88 and the signal of the temperature sensor 88, e.g. in millivolts ("mV") is monitored by the heat controller 106 of the window heat controller 93. When the temperature of the heatable member 32 exceeds a given temperature, e.g. but not limiting to the discussion because of arcing or an increase in the resistance of the coating 62, the heat controller 106 forwards a signal to the switch 98 along the wire 104 to open the switch 98 to electrically disconnect the power supply 74 and the heatable member 32 from one another. The invention is not limited to the cause of the heatable member 32 exceeding the predetermined temperature and any type of defect of the heatable member 32 that caused the predetermined temperature to be exceed is included in the practice of the invention.

The discussion is now directed to a non-limiting embodiment of the signal monitoring and detecting system 100 of the invention. The signal monitoring and detecting system 100 of the invention is designed to detect and act on two different levels of arcing, namely Conditions (b) and (c). One level of arcing (Condition (b)) is termed "major-arcing" and is defined as measured voltage/current exceeding a first predetermined level. The value of the first predetermined level is not limiting to the invention, and the value is selected such that arcing is visible with the unaided eye and/or based on prior experience can damage the window 20. In one non-limiting embodiment of the invention, the first predetermined level is based on the model of the window and the current needed to heat the window to remove fog, snow and ice, and for prevent the formation of fog, snow and ice, on the surface of the window. For example and not limiting to the invention, a window for a Gulfstream aircraft, model number G650, is expected to need 18 21.6 amperes to remove fog, snow and ice, and/or prevent the formation of fog, snow and ice, on the surface of the window. Through observation of the performance of the window when heated, the first predetermined level for this window model for Condition (b) is equal to or above 150 millivolts ("mV").

Consider now the case when there is major arcing without the temperature exceeding the predetermined temperature. The arc sensor 99 senses the major arcing and forwards a signal to the signal modifying system 116. The signal modifying system 116 forwards a signal along the wire 114 to open the switch 110. The control logic of heat controller 106 determines that the switch 110 is in the open position and sends a signal along the wire 104 to open the switch 98 to electrically disconnect the power supply 74 and the heatable member 32 from one another. As can be appreciated by those skilled in the art, when there is major-arcing and the temperature of the heatable member 28 exceeds the predetermined temperature, the switch 110 and/or the switch 98 can open.

Another level of arcing (Condition (c)) is termed "micro-arcing" and is defined as the measured voltage/current exceeding a second predetermined value and less than the first predetermined value. In one embodiment of the invention, the value of the second predetermined level is selected such that the noise level in the current moving through the arc sensing system 99 is filtered out. For example and not limiting to the invention, the noise level for the electrical system of the Gulfstream aircraft was determined for purposes of this invention to be 50 mV, e.g. the voltage measured along cable 102/70 (FIG. 5). Based on the above discussion, in one non-limiting embodiment of the invention, micro-arcing occurs in the range of equal to or greater than 50 mV and less than 150 mV, and major-arcing occurs in the range of equal to or greater than 150 mV, the voltage measured along the wire 70.

In general, a single micro-arc does not adversely effect the operation of the heatable member 32, however, it has been determined that a series of micro-arcs in a given time period is usually followed by major arcing. Therefore, monitoring micro-arcing can be used to prevent major arcing and prevent damage to the window. The predetermined number of micro-arcs in a given time period can be determined from observation and history. In another non-limiting embodiment of the invention, the predetermined number of micro-arcs can be assigned based on a statistical analysis of the performance of heatable members 32. In the practice of the invention, for the Gulfstream aircraft under discussion, the predetermined number for a given time period, e.g. 10 seconds, was 256.

Consider now the case where there is a series of micro-arcing greater than a predetermined number in a given time period without a temperature increase, and/or an indication that there is major arcing. The signal modifying system 116 counts the number of micro-arcs in a given time period in a manner discussed below and when the number of micro-arcing for the given time period is greater than the predetermined number, the signal modifying system 116 forwards a signal along the wire 114 to open the switch 110. The control logic of the heat controller 106 determines that the switch 110 is in the open position and sends a signal along the wire 104 to open the switch 98 to electrically disconnect the power supply 74 and the heatable member 32 from one another. As can be appreciated by those skilled in the art, when there is excessive micro-arcing and the temperature of the heatable member 28 exceeds the predetermined temperature, the switch 110 and/or the switch 98 can open.

Arcing of interest in the present discussion includes, but is not limited to, electric arcing over a crack in the coating 62 and/or one or both bus bars 66 and 68, and/or separation of the bus bars 66, 68 and/or the coating 62. As is appreciated by those skilled in the art, impacts to the glass sheet 60 of the heatable member 32 can result in fractures in the glass sheet 60 that result in fractures in the coating 62. Further, moisture moving through the moisture barrier 36 of the windshield 20 (see FIGS. 2 and 3) can cause delamination of the laminated windshield. Delamination of the windshield can result in separation of one or both of the bus bars 66 and 68 from the conductive coating 62, or the wires embedded in the interlayer 38. The electric arcing over cracks in the conductive coating 62 and separations between the bus bars and the coating result in spot heating which can reach temperatures to cause the glass 60 of the heatable member 32 to fracture. The invention is not limited to the cause of the electric arcing, and arcing resulting from any type of defect of the heatable member 32 is included in the practice of the invention.

The discussion is now directed to a non-limiting embodiment of the arc monitoring and detection system 100 of the invention. The arc monitoring and detection system 100 of the invention is designed to detect major-arcing and micro-arcing, and take action to prevent or limit damage to the heatable member 32 and/or the window 20. The switch 98 and the switch 110 (see FIG. 5) are of the type that open and close in response to signals forwarded to the switch. In the practice of the invention, the switch 98 was of an electronic solid state switch. The control logic of the heat controller 106 of the window heat controller 93 was a comparator of the type that compares the electrical signal, e.g. in mV from the temperature sensor 88 to a set voltage range, and when the signal is outside of the range, the control logic of the heat controller 106 forwards a signal to open the switch 98, and when the signal is within the range, the control logic of the heat controller 106 sends a signal along the wire 104 to close the switch 98.

Another feature of the invention is that the control logic of the heat controller 106 can open and close the switch 98 when there is no major-arcing and/or the number of micro-arcs is less than a predetermined number for a given time period. More particularly, when there is major-arcing and/or the number of micro-arcs is greater than a predetermined number for a given time period, the signal filtering and modifying system 116 of the arc monitoring and detecting system 100 forwards a signal along the wire 114 to maintain switch 110 in the open position, which maintains the switch 98 in the open as previously discussed. The switches 110 and 98 remain open until the arcing problem is resolved. After the arcing problem is solved, the switch 110 is closed. The switch 110 can be closed manually, or by a signal from filtering and modifying system 116 because there no longer is major-arcing, or micro-arcing greater than the predetermined number for the given time period.

Figure 3:
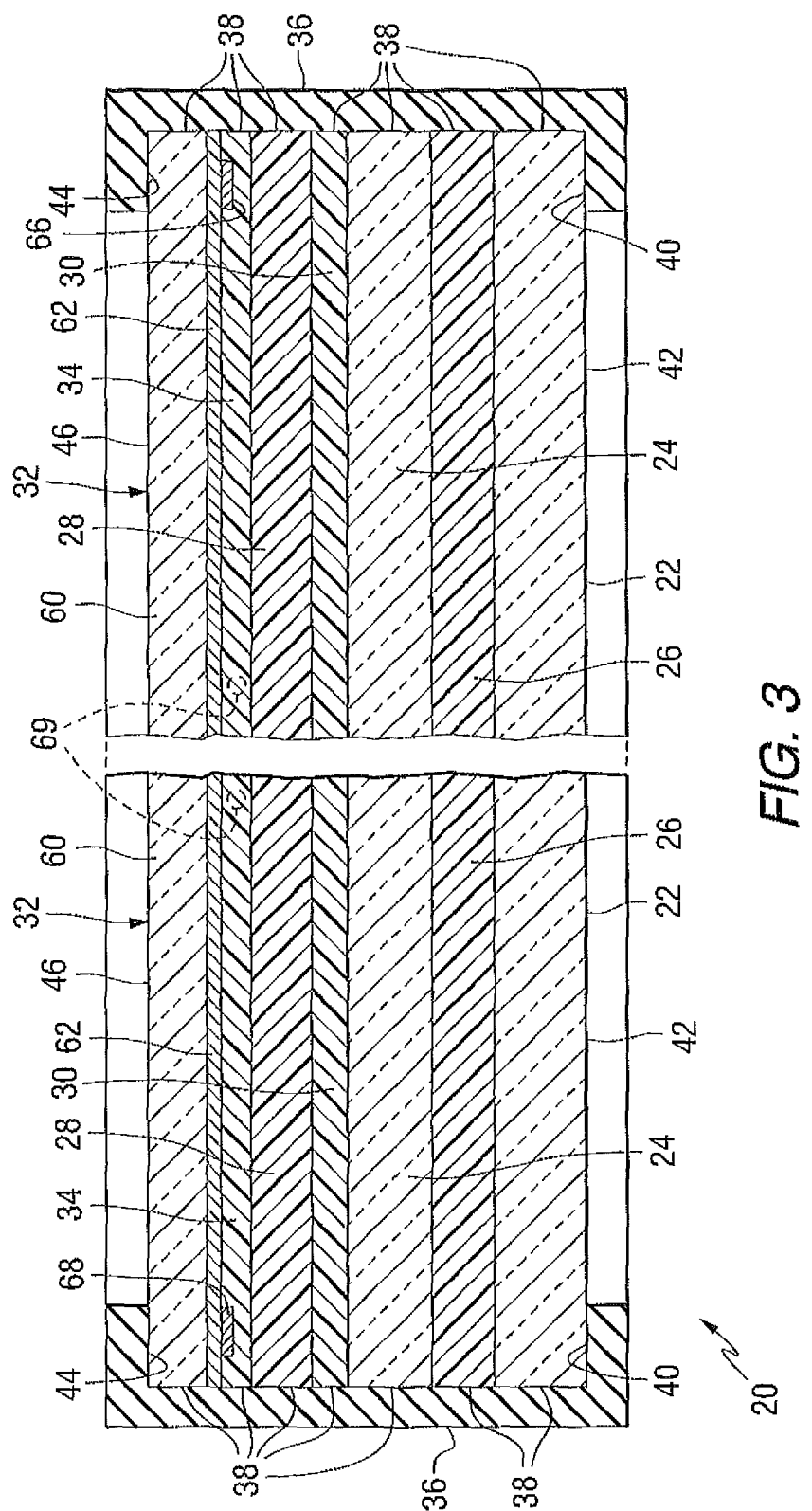
FIG. 3 is a view taken along lines 3-3 of FIG. 2.
Figure 6:
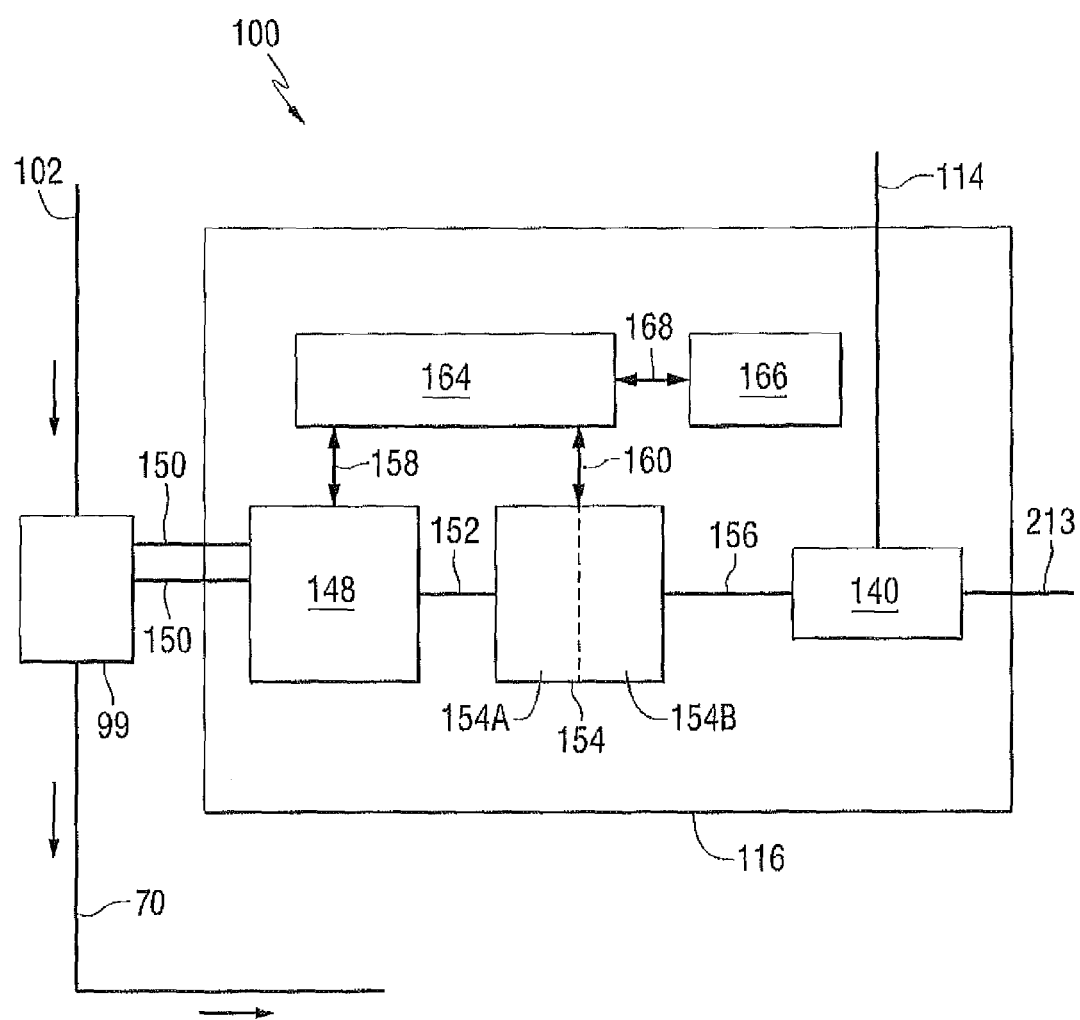
FIG. 6 is a block diagram of a non-limiting embodiment of an arc monitoring system of the invention.

With reference to FIG. 6, the discussion is now directed to the arc detecting and monitoring system 100 to detect major and micro-arcing, and take action to prevent or minimize damage to the heatable member 32 and/or the window 20 (see FIGS. 3 and 4). As shown in FIG. 6, the arc detector 99 is connected to the wire 102 and 70, and the output of the arc detector 99 passed onto the filter 148 by the wires 150. The invention is not limited to the type of arc detector 99 used in the practice of the invention. In the preferred practice of the invention, the arc detector 99 used was a current transformer to reduced the current to a lower level for ease of filtering the current moving along the wires 102 and 70. More particularly, the current transformer 99 produces a reduced current accurately proportional to the current passing through the wires 102/70 to the heatable member 32. For example, in one non-limiting embodiment of the invention, the current passing through the heatable member 32 was 185 amperes and the output of the current transformer 99 was 1.85 amperes. As can be appreciated by those skilled in the art, a reduction from 185 amperes to 1.85 amperes requires the use of a current transformer that has a core (not shown) capable of such a reduction without deterioration of the core due to the heat generated during the reduction. In one non-limiting embodiment of the invention, the current transformer 99 used was sold by Metglas and made of Metglas material. Further as can be appreciated by those skilled in the art, the invention is not limited to the amount of current reduction, and current reduction in the ranges of 25-95% and 50-90% is contemplated by the invention. Still further as can be appreciated by those skilled in the art, the invention is not limited to the use of a current transformer as the arc sensor and the invention contemplates the use of a shunt resistor and a measured resistor as an arc sensor in the practice of the invention.

With continued reference to FIG. 6, the signal filter 148 of the signal filtering and modifying system 116 is a high pass filter to effectively eliminate electrical and magnetic noises from the signals passing along the wires 150. The filter level of the signal filter 148 is based on noise spectral analysis of the electrical system, i.e. the current passing from the power supply 74 to the heatable member 32. As discussed above, in one non-limiting embodiment of the invention signals below 50 mV were filtered out of the signal. The filter 148 also reduces the magnitude of the line signal due to elimination of the high frequency component, e.g. but not limiting to the invention by 2 levels.

The signal from the signal filter 148 is passed onto a two stage filter 154. The first stage 154A includes a comparator to filter out signals having voltage/current levels above the first predetermined level, e.g. 150 mV indicating major arcing. When the signal of the first stage exceeds the first predetermined level, a signal is sent along the line 156 to the signal switch 140 that major arcing has been detected, and the signal switch 140 sends a signal along the line 114 to open the switch 110, which causes the control logic of the heat controller 106 to open the switch 98 to prevent the current from moving from the power supply 74 to the heatable member 32 (see FIG. 5) as discussed above.

The signal from the first stage 154A of the filter is passed onto the second stage 154b. The signal having a voltage/current value within the range of the first and the second predetermined levels, e.g. between 50 to 150 mV are indicative of micro-arcing. The second stage 154b of the two stage filter 154 counts the number of impulses in the signal between the first and the second predetermined levels for a given time period, which is indicative of micro-arcing for the give time period. In one non-limiting embodiment of the invention when the count exceeds 256 for a time period of 10 seconds, excess micro-arcing is considered to have occurred, and the filter 154B forwards a signal along the line 156 to the signal switch 140 that excessive micro-arcing has been detected. The signal switch 140 sends a signal along the line 114 to open the switch 110, which causes the control logic of the heat controller 106 to open the switch 98 to prevent the current from moving from the power supply 74 to the heatable member 32 (see FIG. 5) as discussed above. In the instance when the time period ends and the count of micro-arcing is less than the predetermined number, the filter 154B restarts the count for another time period.

With continued reference to FIG. 6, the signal filter 148 and the dual filter 154 are each connected by a wire 158 and 160, respectively, to a micro-computer 164, and the micro-computer 164 is connected to electronic storage 166 by wire or cable 168. The micro-computer 164 sets the level, e.g. the second predetermined level for the filter 148 to filter the noise from the signal from the arc detector 99, sets the level, e.g. the first predetermined level for the filter 154A to identify major-arcing, and sets the count and time period for the filter 154B for the micro-arc count. The electronic storage 166 maintains a history of the activities of the filter 148 and two stage filter 154 to provide data for setting the predetermined first level indicating micro-arcing, the second predetermined level indicating noise level in the signal from the arc detector 99, and the micro arc count and time period to indicated a potential problem due to micro-arcing.

In one non-limiting embodiment of the invention, the micro-computer 164 contains the "firmware" which is a burnt in program right on electronic board. The system software was a Windows® based application program. The system is able to detect the two different levels of arcing, e.g. major-arcing and micro-arcing that can be set by the user. Once a micro-arc is detected a counter is enabled in order to keep track of how many micro-arcs occur in a defined period of time. These events are stamped with date, time and magnitude of the arc and then stored on a circuit board for later retrieval.

The signal filtering and modifying system 116 provides three orders of discrimination. A very low discrimination order, e.g. 50 mV, which is associated with unwanted external noise, if any, is the first order to be adjusted. Under this order, the signals are disregarded as being caused by noise from the power supply 72. The second order are signals above a first predetermined level indicating major-arcing. And the third order are signals between the first predetermined level and the second predetermined level indicating micro-arcing.

Although not limiting to the invention, data process for micro-arcing was as follows: if the computer 164 finds a flip-flop high in a close succession without any break, then the computer 164 handles this bunch of data as a pocket. The experience is that spark impulses come in groups, which will be represented by the packets. One packet can include a maximum number of impulses, e.g. but not limiting to the invention 256 impulses. The term "impulse" does not mean the impulses, e.g. the MHz impulses are above the output of the filter 154B, but it means that the computer 164 found a packet on the output of the bistable multi-vibrator commonly called flip flop in the time measuring cycle, e.g. 10 mille second long. In one non-limiting embodiment of the invention, when the number of impulses exceeds a set amount, e.g. 256 within the given time period, e.g. 10 seconds, then the 256 impulse will constitute a new packet for a new time period. First experiments, in general showed that the packets are roughly 1-40 impulses long.

With reference to FIG. 7, in another non-limiting embodiment of the invention, the computer 164 and electronic storage 166 are mounted in a cabinet 210 housing the health monitoring system of the airplane 18. In one non-limiting embodiment of the invention, the cabinet 210 can include a speaker 212 connected to the signal switch 140 by a wire or optical coupler 213 (see FIG. 6) to provide audible information regarding the performance of the heatable member 32 of the windshield 20, and an alarm 214 to bring attention to the computer 164 to provide the personnel within the aircraft with real time performance of the windshield 20. In another non-limiting embodiment of the invention, the cabinet 210 has a wireless transmitter and receiver 220 to transmit signals 222 regarding the performance of the heatable member 28 (see FIG. 4) of the windshield 20 and to receive signals 224 regarding scheduled times and locations when repair and maintenance of the windshield 20 is required, as disclosed in U.S. patent application Ser. No. 12/345,932.

In another non-limiting embodiment of the invention, the Faraday box 109 having selected ones of the components of the intelligent electrical power controller and monitoring system control system 72 (see FIG. 5) is mounted to the peripheral edge of the window 20 (see FIG. 8). In this non-limiting embodiment of the invention, the Faraday box 109 is mounted over the peripheral edge 38 of the windshield 20, e.g. but not limiting to the invention over the peripheral edges of the glass sheets 22 and 24 and the interlayer 26. A protective plastic layer 230 is provided between the peripheral edge 38 of the windshield 20 and the Faraday box 109 to prevent marring of the glass edges due to vibrations. A cable 232 extends out of the edge sealing member 36 and is connected to cable 234 by connector 236 of the type used in the aircraft art. In this embodiment of the invention, the components mounted in the Faraday Box 109 include, but are not limited to, the filter 148, the dual filter 154 and the signal switch 140. The cables 232 and 234 carry the wires 70 and 71 to the heatable member 32, the wire 114 from the signal switch 140 to the switch 110, and the wire 150 from the arc detector 99 and the wires 158 and 160 from the computer 164 to the filter 148 and the two stage filter 154. The wire 111 connects the Faraday Box 109 to ground (see FIG. 5). The edge sealing member 38 overlays the marginal edges 40 and the peripheral edges 38 of the windshield 20 as discussed above, and the edge sealing member 38 also overlays the Faraday Box 109 as shown in FIG. 8. After the windshield 20 is mounted in the body of the aircraft 18, the cables 222 and 224 are connected.

With reference to FIG. 9, there is shown another non-limiting embodiment of the invention for mounting the intelligent electrical power controller and monitoring system 72 (see FIG. 5) of the invention to the windshield. In FIG. 9, the glass sheet 22 has an integrated circuit 260 including, but not limiting to the invention, the filter 148, the two stage filter 154 and the signal switch 140 applied over the surface 262 of the glass sheet 22 opposite to the surface 42 of the glass sheet 22 facing the interior of the aircraft 18. The interlayer 26 overlays the surface 262 of the glass sheet 22 as discussed above and overlays the integrated circuit 260. Applying integrated circuits to a glass surface is well known in the art and no further discussion is deemed necessary.

The invention is not limited to the embodiments of the invention presented and discussed above which are presented for illustration purposes only, and the scope of the invention is only limited by the scope of the following claims and any additional claims that are added to applications having direct or indirect linage to this application.

What is claimed is:

1. An aircraft comprising a windshield having a heatable member for removing snow, fog and/or ice from an outer surface of the windshield, the heatable member comprising a pair of spaced bus bars and an electrically conductive member between and in electrical contact with the spaced bus bars, the bus bars connected to an electrical power source to flow current through one of the bus bars, through the electrically conductive member and through the other bus bar to heat the electrically conductive member to heat the outer surface of the windshield, and an electrical system to monitor and/or control performance of the heatable member, the electrical system comprising:
   a temperature sensor for sensing the temperature of the heatable member;
   a first switch electrically connecting the power source to one of the bus bars of the heatable member, wherein the first switch in a closed position provides a continuous electrical path from the power source through the first switch to the heatable member, and the first switch in an open position electrically separates the power source from the heatable member to deactivate the heatable member;
   an arc monitoring and detection system for monitoring voltage of the electrical system at a position between the power source and the heatable member;
   a heat controller electrically connected to the temperature sensor and acting on the first switch to open the first switch when the temperature of the temperature sensor exceeds a predetermined temperature;
   a second switch electrically connecting the temperature sensor to the heat controller, wherein the second switch in a closed position electrically interconnects the temperature sensor and the heat controller, and in an open position disconnects the heat controller and the temperature sensor, wherein the second switch is moved from the closed position to the open position by a signal from the arc monitoring and detection system indicating that the voltage and/or current measured by the arc monitoring and detection system exceeds a predetermined level;
   wherein with the first switch and the second switch in the closed position a first electric path is provided from the power supply through the first switch, through the heatable member to the power source, and a second electrically conductive path is provided from the temperature sensor, through the second switch, to the heat controller, wherein the heat controller opens the first switch when the temperature of the heatable member measured by the temperature sensor equals and/or exceeds a predetermined temperature, and
   wherein the arc sensor sends a signal to open the second switch when the voltage and/or current measured by the arc sensor exceeds a predetermined level and the heat controller responsive to the opening of the second switch opens the first switch.

2. The aircraft according to claim 1, wherein the arc monitoring and detection system comprises a current transformer and the current transformer produces a reduced current proportional to the current passing through the current transformer.

3. The aircraft according to claim 1 wherein the arc monitoring and detection system, the first switch, the second switch, and the heat controller are mounted in a Faraday box.

4. The aircraft according to claim 3, wherein the Faraday box is mounted on the aircraft transparency.

5. The aircraft according to claim 1, wherein the windshield is a laminated transparency and the arc sensor is in the form of a printed circuit and adhered to a surface of one of a layer of the aircraft laminated transparency.

6. The aircraft according to claim 1, wherein the signal from the arc monitoring and detection system to the second switch above a current/voltage first predetermined level indicates major arcing, which is arcing at the electrically conductive member of the heatable member that is visible with the unaided eye, the signal from the arc monitoring and detection system above a current/voltage second predetermined level and below the first predetermined level is defined as minor arcing and further comprising a controller acting on the arc monitoring and detection system to change settings of the first and second predetermined levels.

7. The aircraft according to claim 6, wherein the arc monitoring and detection system forwards a signal to the second switch to open the second switch when the current/voltage of the heatable member is equal to or above the first predetermined level, and forwards a signal to the second switch to open the second switch when the current/voltage is equal to or above the second predetermined level and below the first predetermined level.

8. The aircraft according to claim 7, wherein a signal to open the second switch is sent by the arc monitoring and detection system when there is a predetermined number of arcing within a predetermined time period below the current/voltage second predetermined level.

9. The aircraft according to claim 8, wherein the predetermined signal received by the heat controller from the temperature sensor indicates that the electrically conductive member is equal to or has exceeded a predetermined temperature.

10. The aircraft according to claim 1 wherein the first switch is an electronic solid state switch and second switch is an electronic switch.

11. The aircraft according to claim 1 wherein the heat controller comprises control logic to determine the opening of the first switch.

12. The aircraft according to claim 1 wherein the heat controller closes the second switch when the second switch is open and the temperature of the temperature sensor is below the predetermined temperature.

13. A method of controlling electrical input to a heatable member of an aircraft transparency to eliminate overheating and/or arcing of the heatable member, wherein the heatable member comprises an electrically conductive member between and in contact with a pair of spaced bus bars to heat outer surface portion of the transparency, the method comprising;

establishing a first electrical circuit extending from a first pole of an electrical power supply through a first switch to the heatable member, through the heatable member to a second pole of the electric power supply to heat the heatable member to heat the outer surface portion of the transparency;

establishing a second electrical circuit extending from a temperature sensor operatively connected to the heatable member, through a second switch to a heat controller, wherein the temperature sensor generates a signal representing the temperature of the heatable member;

forwarding the signal from the temperature sensor to the heat controller, wherein when the heat controller controller measures a temperature of the heatable member above a predetermined temperature the heat controller opens the first switch;

monitoring current/voltage from the power source to the heatable member to determine if the measured current/voltage is above a predetermined current/voltage value, wherein the monitoring current/voltage is practiced at a position between the power source and the heatable member; and acting on the second switch to open the second switch when the monitoring current/voltage is above a predetermined current/voltage value and acting on the heat controller to open the first switch, if closed.

14. The method according to claim 13 wherein the predetermined selected information indicates arcing of the electrically conductive member.

15. The method according to claim 13, wherein the predetermined current/voltage value above a current/voltage first predetermined level indicates major arcing, which is arcing at the electrically conductive member of the heatable member that is visible with the unaided eye, the signal from the arc monitoring and detection system above a current/voltage second predetermined level and below the first predetermined level is defined as minor arcing and further comprising a controller acting on the arc monitoring and detection system to change settings of the first and second predetermined levels.

16. The method according to claim 13 wherein the heat controller closes the second switch when the second switch is open and the temperature of the temperature sensor is below the predetermined temperature.

* * * * *